Aug. 3, 1965  D. J. GORDON  3,198,276
DRIVEN VEHICLE FOR OPERATING IMPLEMENTS
Filed May 21, 1962  4 Sheets-Sheet 1
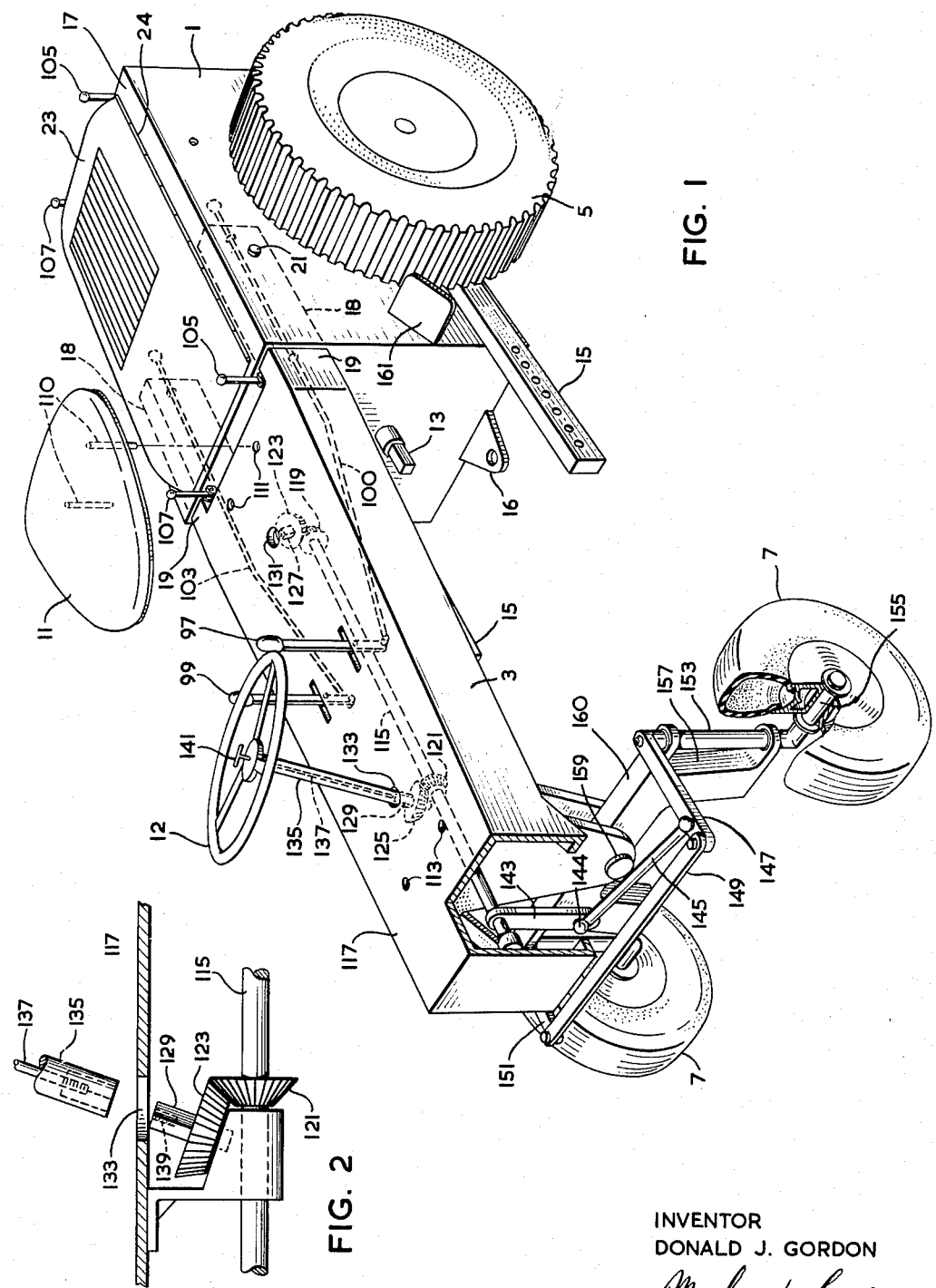
INVENTOR
DONALD J. GORDON
BY: *Maybee & Legris*
ATTORNEYS

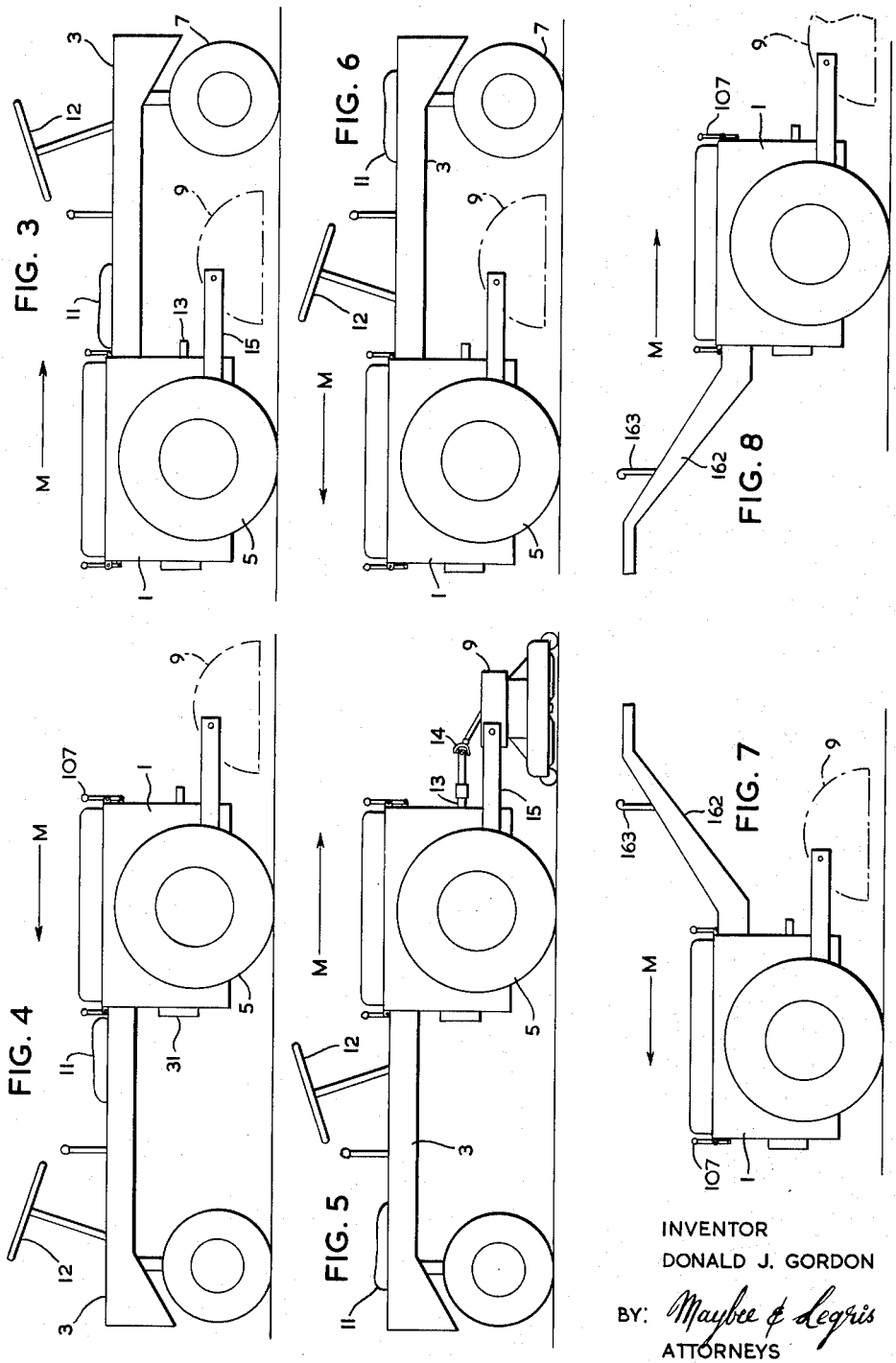

INVENTOR
DONALD J. GORDON
BY: *Maybee & Legris*
ATTORNEYS

INVENTOR
DONALD J. GORDON
BY: Maybee & Legris
ATTORNEYS

United States Patent Office 3,198,276
Patented Aug. 3, 1965

3,198,276
DRIVEN VEHICLE FOR OPERATING IMPLEMENTS
Donald J. Gordon, Rouge Park, Ontario, Canada, assignor, by mesne assignments, to Turnbull Elevator Limited, Toronto, Ontario, Canada, a corporation
Filed May 21, 1962, Ser. No. 196,344
8 Claims. (Cl. 180—11)

This invention relates to a driven vehicle for operating a variety of implements.

The principal object of the invention is to provide a vehicle in respect to which implements may be arranged in a variety of ways for operation by the vehicle.

This object is accomplished by providing a motive power unit with means for attaching implements thereto for operation by the power unit, and means for making different relative arrangements of an operator's carrier, the power unit and the implements.

A preferred embodiment of the invention is illustrated in the accompanying drawings in which:

FIGURE 1 is a partly exploded perspective view of a vehicle with parts broken away to show some of the mechanism;

FIGURE 2 is a partly exploded and partly sectional view of part of the steering mechanism;

FIGURE 3 is a more diagrammatic side view of the vehicle, with the power unit and operator's carrier arranged as in FIGURE 1;

FIGURE 4 is another diagrammatic side view of the vehicle, with the carrier at the opposite end of the power unit as compared to FIGURE 3;

FIGURE 5 is another diagrammatic side view, with the seat and steering wheel re-arranged as compared to FIGURE 4;

FIGURE 6 is another diagrammatic side view, with the seat and steering wheel re-arranged as compared to FIGURE 3;

FIGURE 7 is a diagrammatic side view showing the operator's carrier replaced by control handles;

FIGURE 8 is a view similar to FIGURE 7 but with the control handles at the opposite end of the power unit;

Figure 9:
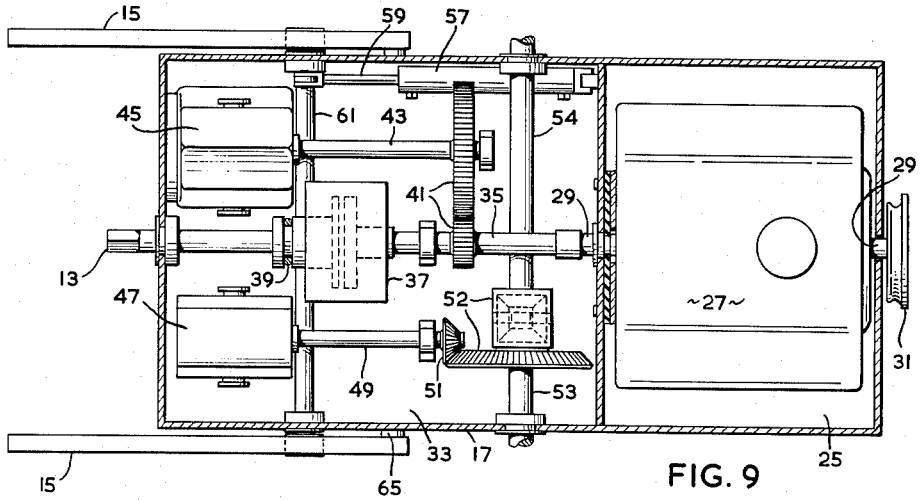
FIGURE 9 is a partly sectional plan view of the power unit.

Referring to FIGURE 3, the vehicle consists of a power unit 1 and an operator's carrier 3 connected to one end of the power unit. The power unit is supported on reversible drive wheels 5, and the carrier on wheels 7, the wheels 5 and 7 being spaced apart longitudinally of the vehcile so that an implement 9 can be attached to the power unit between the wheels 5 and 7. (The implement 9 is merely indicated by dashed lines in FIGURE 3. In FIGURE 5 a typical implement 9, in this case a rotary mower, is shown in full lines.) The carrier has an operator's seat 11 and a steering wheel 12 whereby an operator on the seat can steer the carrier wheels 7.

The direction of movement of the vehicle is indicated by the arrow M. In the arrangement of FIGURE 3, with the drive wheels 5 at the rear of the vehicle, and the implement 9 ahead of the power unit, the vehicle is suitably arranged for the implement 9 to be, for example, a power brush, a vacuum cleaner, a rotary mower or a grader blade located below the vehicle. The means for attaching such implements to the power unit consist of a power take-off 13 which can drive the implement through universal joints (as shown for example at 14 in FIGURE 5), a pair of arms 15 supported one at each side of the power unit, and a drawbar 16 (FIGURE 1), although all these attaching means are not required for every implement.

FIGURE 4 shows the vehicle with the carrier 3 connected to the opposite end of the power unit 1 from that of FIGURE 3. In FIGURE 4, the drive wheels 5 are still at the rear of the vehicle (the arrow M in FIGURE 4 again showing the direction of travel of the vehicle) but the implement 9 is behind the power unit. This arrangement is suitable for such implements as cultivators, rotary tillers, trenchers, aerators, thinners, sprayers, rollers, sweepers, rotary mowers and wagons, but it is not ideal for such operations as mowing because the wheels, and particularly the heavily loaded wheels 5 of the power unit, roll over the grass ahead of the mower.

FIGURE 5 shows an arrangement in which the operator's seat 11 and the steering wheel 12 have been relocated with respect to the arrangement of FIGURE 4, so that the drive wheels 5 are now at the front of the vehicle and the implement 9 is ahead of the power unit. This arrangement is suitable for such implements as rotary mowers, reel mowers, snow plows, snow blowers, earth scoops, and cement mixers.

In FIGURE 6 the carrier 3, with the seat 11, and steering wheel 12 arranged as in FIGURE 5, has been connected to the opposite end of the power unit 1 from that of FIGURE 5, so that the drive wheels 5 are still at the front of the vehicle but the implement 9 is behind the power unit, between the wheels 5 and 7. This arrangement is particularly suitable for a sod cutting implement 9, because the main weight of the vehicle is on the wheels 5 ahead of the cutter and the wheels 7 of the carrier stabilize the vehicle without harming the sod. This arrangement is also suitable for a cultivator or a rotary mower, or for a sickle mower mounted to one side of the vehicle.

The arrangements of FIGURES 3 and 6, with the implement located below the operator's carrier, are shorter and thus more compact than those of FIGURES 4 and 5 and from the operator's seat 11 offer greater visibility for the operation of the implement. However, the various arrangements of FIGURES 3 to 6 make it possible for the operator to locate the implement 9 in the place most suitable for the particular work to be done. One way of constructing the power unit and the carrier to permit these various arrangements to be made will now be described with reference to other figures of the drawings.

Figure 10:
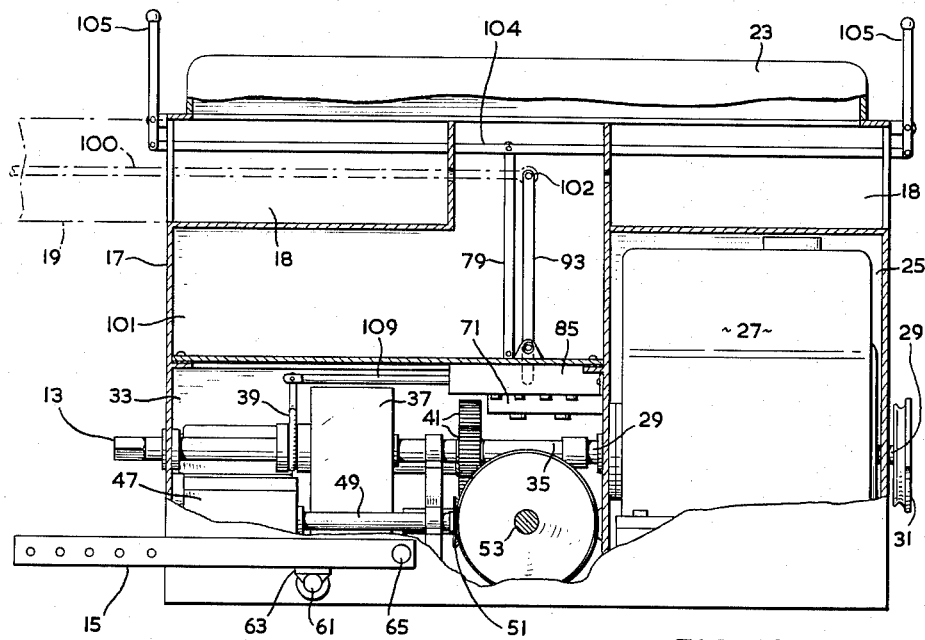
FIGURE 10 is a partly sectional side view of the power unit showing parts of the operator's carrier in phantom lines.

As shown in FIGURE 1, the power unit 1 has a housing 17. Near the top of the housing, along the sides, are elongated horizontal receptacle portions 18, two at each end of the power unit; the two receptacle portions 18 at one end are indicated by dotted lines in FIGURE 1, and one of the receptacle portions at each end is shown in FIGURE 10. The carrier 3 has a pair of elongated frame members 19 which can slide into the receptacle portions 18 at either end of the power unit, and removable hand turned bolts 21 (FIGURE 1) can be passed through registering holes in the housing 17 and frame members 19 to secure the frame members in the receptacle portions. Thus it is a simple matter to connect the carrier to either end of the power unit.

At the top of the housing 17 is a hood 23 which can be opened on hinges 24 for access to the interior of the housing. Thus, access can be had, between receptacle portions 18, to a compartment 25 (FIGURE 10) in the housing where the driving motor 27 of the power unit is located. The motor shaft 29 protrudes at one end through the housing and a pulley 31 is mounted on this end for starting the motor 27 if an electric starter is not provided. The other end of the shaft 29 protrudes into an oil filled compartment 33 of the housing, and it is there coupled to a shaft 35 which drives a power take-off clutch 37. By means of an actuating fork 39 the clutch 37 can be engaged to drive the power take-off shaft 13.

As best seen in FIGURE 9, the shaft 35, through gears 41 and a shaft 43, drives an oil pump 45. Oil connections from the pump 45 are not, for simplicity, shown in FIGURES 9 and 10 but they will be described below with reference to FIGURE 11. However, through such connections the pump 45 can drive an oil motor 47 and the latter, through a shaft 49, and gear 51, drives differential gearing 52 of the transverse shafts 53, 54 on which the drive wheels 5 of the power unit are mounted. A conventional mechanictal drive could of course be used instead of the pump 45 and oil motor 47.

Also within the oil filled chamber 33 is a cylinder 57 having a movable piston rod 59. Movement of the rod 59 causes rotation of a transverse shaft 61 the ends of which protrude from the housing 17. Each protruding end of the shaft 61 has a cam 63 on which one of the arms 15 rests gravitationally, each arm being pivoted at one end 65 to the housing. Rotation of the shaft 61 causes the arms 15 to be lifted, thus raising an implement 9 that is supported by the arms. This may be useful if the implement is to be raised clear of the ground when it is not in use. Since the arms 15 are pivoted at 65 their opposite ends are free to rise unhindered by the cams 63 if ground conditions force the implement upwardly while it is in contact with the ground.

Figure 11:
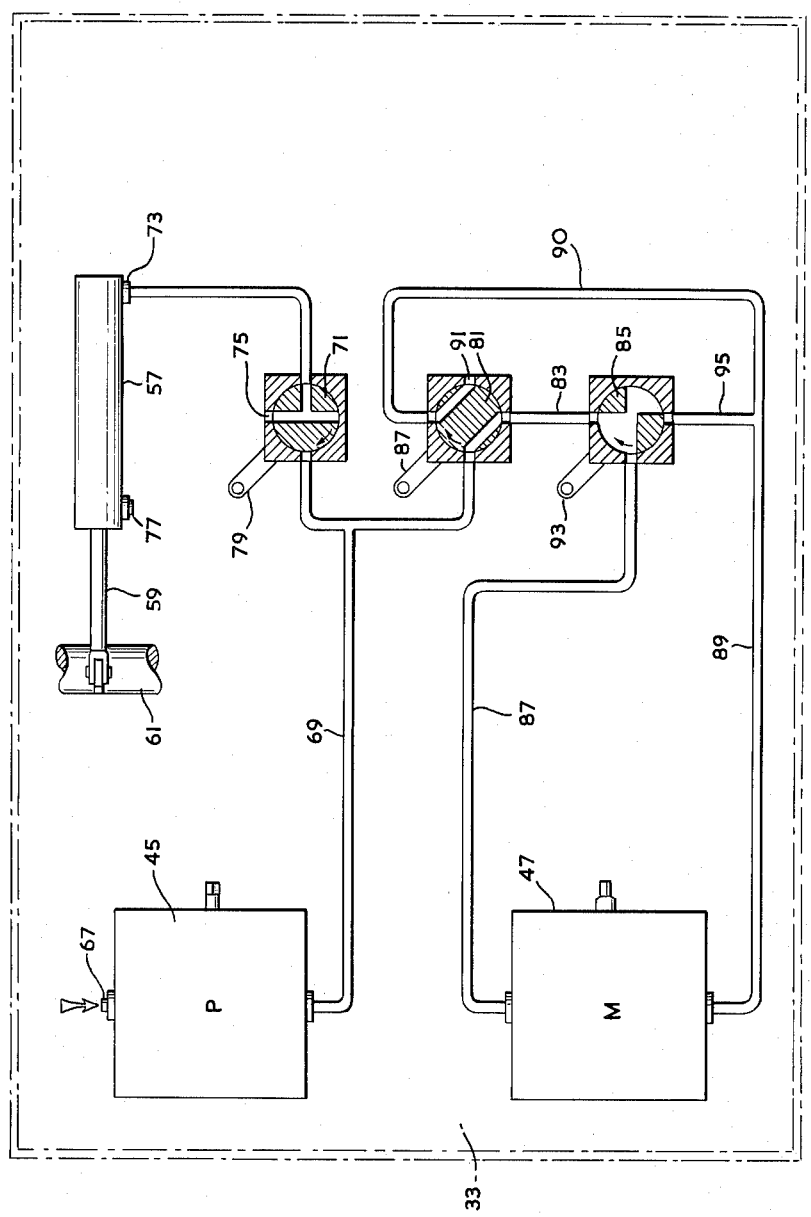
FIGURE 11 is a schematic plan view of the oil connections for the drive of the power unit.

Oil connections for the power unit are shown schematically in FIGURE 11. From the interior of the oil filled compartment 33 the pump 45 draws in oil at its intake 67 and delivers it under pressure to a line 69. A valve 71 normally connects one end 73 of the cylinder 57 to a port 75 communicating with the interior of the compartment 33, the other end 77 of the cylinder 57 also communicating with the interior of the compartment. However by means of a lever 79 the valve 71 can be rotated to connect the end 73 of the cylinder to the pressure line 69, thus causing the piston rod 59 to be extended to rotate the shaft 61 and raise the arms 15.

In FIGURE 11 the pressure line 69 is shown to be connected through a reversing valve 81, line 83, speed control valve 85 and line 87 to the oil motor 47, the motor 47 having a return line 89, 90 through the valve 81 to a port 91 communicating with the interior of the compartment 33. The direction of rotation of the motor 47 can be reversed by moving the valve 81, by means of a lever 87, so that the line 69 is connected to the line 90 and the line 83 to the port 91. The speed of the motor can be reduced by rotating the valve 85 by means of a lever 93 to bypass part of the oil flow through a bypass line 95.

It is desirable to provide the operator with convenient means for operating the valve levers 79, 87 and 93 and the clutch actuating fork 39. The speed control lever 93 is operated by a control lever 97 (FIGURE 1) pivoted on the carrier between the locations of the seat 11 and the steering wheel 12. This lever has a linkage 100 which extends through one of the carrier frame members 19 and protrudes into a compartment 101 (FIGURE 10) of the housing 17 below the hood 23. With the hood open, it is a simple matter for the operator to pin the linkage 100 by a pin 102 to the valve operating lever 93. Similarly, the reversing lever 87 (which in FIGURE 10 is concealed behind the lever 93) is operated by a control lever 99 (FIGURE 1) having a linkage 103 (shown in FIGURE 1 but concealed behind the linkage 100 in FIGURE 10) extending into the compartment 101 and pinned to the lever 87. The lever 79 for the cylinder valve 71 is connected to a linkage 104 which can be operated from either end of the power unit by control levers 105 pivoted on the ends of the power unit where they are fairly accessible to an operator. Similarly, levers 107 (FIGURE 1) on the ends of the power unit are connected through a linkage like 104 and a lever like 79 to a linkage 109 (FIGURE 10) for operating the clutch actuating fork 39.

So that the operator's seat 11 can be moved on the carrier from the position of FIGURE 3 or 4 to that of FIGURE 5 or 6, the seat has a pair of dowels 110 (FIGURE 1) which can register in holes 111 near the carrier frame members 19 or in holes 113 over the wheels 7. To permit the steering wheel 12 to be moved from one end of the carrier to the other, the carrier has a longitudinal shaft 115 journalled on the underside of the carrier frame 117 and provided with bevel gears 119 and 121 located near the power unit end of the carrier and near the wheel end of the carrier respectively. These bevel gears each mesh with another bevel gear 123, 125, the latter gears also being journalled on the carrier frame and having upwardly inclined stub shafts 127, 129 aligned with holes 131, 133 in the carrier frame. The stub shafts 127, 129 are rectangular in cross section, and the steering wheel 12 has a shaft 135 with a socket in its lower end of the same cross section as the stub shafts so that the steering wheel shaft 135 may be slipped through either of the holes 131, 133 and over the stub shaft below it so that rotation of the steering wheel will cause the bevel gears and thus the longitudinal shaft 115 to rotate. To fix the steering wheel shaft 135 to either stub shaft, a hand screw 137 extends lengthwise of the shaft 135 and has threaded lower end which can be screwed into a corresponding threaded hole 139 in the stub shaft, the hand screw having a T-shaped head 141 at the steering wheel whereby it can be turned to secure it to the stub shaft.

Rotation of the longitudinal shaft 115 to steer the vehicle causes rotation of crank 143 which, through a ball-in-socket connection 144 with a drag link 145, rotates a steering arm 147 of one of the wheels 7, this steering arm being connected by a tie rod 149 to a similar steering arm 151 for the other wheel 7. The steering arms rotate vertical king pins 153 which form part of the wheel axles 155, the king pins being journalled in a yoke 157 which is pivoted at 159 to the carrier frame 117. The top surface of the yoke provides foot rests 160 at one end of the carrier. Foot rests 161 can also be provided on the sides of the housing 17.

A gas tank, starting motor and battery for the power unit can be located in the compartment 101 of the housing 17 but for clarity they have not been shown.

As illustrated in FIGURES 7 and 8 it is possible to replace the operator's carrier by a pair of elongated control handles 162 which register in the receptacle portions 18 of the power unit 1 at either end of the latter. The operator can thus walk behind the power unit, at the same end as the implement 9 (FIGURE 7) or at the opposite end from it (FIGURE 8), and he can control the power unit by the levers 105 and 107 on the power unit and by levers 163 on the handles corresponding to the levers 97, 99 on the operator's carrier. The arangement of FIGURE 7 is suitable, for example, for rotary tillers and cultivators; that of FIGURE 8 is suitable for rotary mowers, reel mowers, snow plows and snow blowers.

The power unit can of course be used separately as a stationary power plant for generators, pumps, saws and the like.

What I claim as my invention is:

1. A driven vehicle for operating implements, comprising a power unit having reversible drive wheels for moving the power unit with respect to the earth and means for attaching implements to the power unit at one end of the power unit to move therewith, a wheel supported operator's carrier having a place for an operator to sit, and controls for the vehicle on said carrier and operable from said place for the operator to sit, the power unit and the carrier having means, independent of the implement attaching means, for connecting the carrier to support the operator alternatively at said one end and at the opposite end of the power unit without interfering with the attachment of implements to the power unit and with the wheel of the power unit and carrier longitudinally spaced apart.

2. A driven vehicle for operating implements, comprising a power unit having reversible drive wheels for moving the power unit with respect to the earth and means for attaching implements to the power unit at one end of the power unit to move therewith, a wheel supported operator's carrier having a place for an operator to sit, and controls for the vehicle on said carrier and operable from said place for the operator to sit including carrier wheel steering means operable by the operator, the power unit and the carrier having means, independent of the implement attaching means, for connecting the carrier to support the operator alternatively at said one end and at the opposite end of the power unit without interfering with the attachment of implements to the power unit and with the wheels of the power unit and carrier longitudinally spaced apart.

3. A machine as claimed in claim 2, wherein the place for the operator to sit and the steering means are relatively movable to locate each between the other and the connecting means so that the operator can face in opposite directions.

4. A machine as claimed in claim 3, wherein the means for attaching implements comprise a power take-off of the power unit.

5. A machine as claimed in claim 4, wherein the means for attaching implements further comprise means for raising and lowering the implements relative to the power unit.

6. A machine as claimed in claim 5, wherein the connecting means comprise elongated receptable portions of the power unit and elongated frame members of the carrier slidable into said receptacle portions.

7. A machine as claimed in claim 1, wherein the connecting means comprise elongated receptacle portions of the power unit and elongated frame members of the carrier engageable in said receptacle portions from either end of the power unit, the machine also having elongated handle means engageable in said receptacle portions from either end of the power unit in lieu of the carrier whereby an operator can walk at either end of the power unit.

8. A driven vehicle for operating implements, comprising a wheel supported power unit having means for driving the wheels in one direction and in the opposite direction, a wheel supported operator's carrier, the power unit having separate means for attaching the carrier to the power unit and for attaching implements to the power unit with the wheels of the power unit and the carrier longitudinally spaced apart, the means for attaching the carrier to the power unit comprising means for locating the carrier alternatively at opposite ends of the power unit, the means for attaching implements to the power unit comprising means driven by the power unit, the carrier being arranged with a place for an operator to sit on the carrier and also being arranged with means thereon permitting said operator to operate the vehicle facing the power unit and facing away from the power unit.

References Cited by the Examiner

UNITED STATES PATENTS

| 738,997 | 9/03 | Haynes et al. | 280—95 X |
| 1,349,924 | 8/20 | Swanson | 180—66 X |
| 2,237,937 | 4/41 | Kales | 180—11 |
| 2,644,540 | 7/53 | Balzer | 180—77 |
| 2,704,131 | 3/55 | Vahs | 180—66 |
| 2,796,140 | 6/57 | Knolle | 180—77 |

FOREIGN PATENTS

| 802,608 | 2/51 | Germany. |
| 835,260 | 3/52 | Germany. |
| 872,874 | 4/53 | Germany. |
| 1,143,746 | 4/57 | France. |

A. HARRY LEVY, *Primary Examiner.*
PHILIP ARNOLD, *Examiner.*